US010083485B2

(12) United States Patent
Mehew et al.

(10) Patent No.: US 10,083,485 B2
(45) Date of Patent: Sep. 25, 2018

(54) ALTERNATIVE VALUE EXCHANGE SYSTEMS AND METHODS

(71) Applicant: The Western Union Company, Englewood, CO (US)

(72) Inventors: Evans Mehew, Larkspur, CO (US); Gail Galuppo, Lone Tree, CO (US)

(73) Assignee: The Western Union Company, Englewood, CO (US)

( * ) Notice: Subject to any disclaimer, the term of this patent is extended or adjusted under 35 U.S.C. 154(b) by 1117 days.

(21) Appl. No.: 14/176,159

(22) Filed: Feb. 10, 2014

(65) Prior Publication Data

US 2014/0156497 A1 Jun. 5, 2014

Related U.S. Application Data

(63) Continuation of application No. 12/576,931, filed on Oct. 9, 2009, now Pat. No. 8,688,563.

(Continued)

(51) Int. Cl.
*G06Q 30/00* (2012.01)
*G06Q 40/04* (2012.01)
(Continued)

(52) U.S. Cl.
CPC .............. *G06Q 40/04* (2013.01); *G06Q 20/10* (2013.01); *G06Q 30/06* (2013.01); *G06Q 30/0601* (2013.01)

(58) Field of Classification Search
CPC ................... G06Q 30/00–30/08; G06Q 40/04
See application file for complete search history.

(56) References Cited

U.S. PATENT DOCUMENTS 6,523,012 B1 * 2/2003 Glassman .............. G06Q 20/02
705/75
7,677,974 B2 * 3/2010 Van Luchene .......... A63F 13/12
463/29
(Continued)

FOREIGN PATENT DOCUMENTS

WO 2011008630 1/2011

OTHER PUBLICATIONS

International Search Report and Written Opinion of related application PCT/US2010/041363 dated Jan. 14, 2012, 6 pages.
(Continued)

*Primary Examiner* — Michael Misiaszek
(74) *Attorney, Agent, or Firm* — Kilpatrick Townsend & Stockton, LLP (57) ABSTRACT

This disclosure describes, generally, methods and systems for exchanging alternative currencies. The method includes creating, at an alternative currency platform, a plurality of user accounts and receiving, from a first user in the plurality of user accounts, an alternative currency exchange offer. The alternative currency exchange offer includes one or more offer terms and associated assets. Furthermore, the method includes extending the alternative currency exchange offer from the first user to the second user, in response to receiving acceptance of the offer from the second user, verifying the associated assets of the first user and the second user, and in response to verification of the assets of the first user and second user, providing settlement of the alternative currency exchange offer.

20 Claims, 4 Drawing Sheets

Related U.S. Application Data

(60) Provisional application No. 61/225,256, filed on Jul. 14, 2009.

(51) Int. Cl.
  *G06Q 30/06*         (2012.01)
  *G06Q 20/10*         (2012.01)

(56) References Cited

U.S. PATENT DOCUMENTS

| | | |
|---|---|---|
| 2003/0014749 A1 | 1/2003 | Simons et al. |
| 2007/0117615 A1 | 5/2007 | Van Luchene |
| 2007/0219869 A1 | 9/2007 | Haines et al. |
| 2008/0120221 A1 | 5/2008 | Toneguzzo |
| 2008/0281444 A1* | 11/2008 | Krieger .................. A63F 13/12 700/91 |
| 2009/0089168 A1 | 4/2009 | Schneck |
| 2009/0098939 A1* | 4/2009 | Hamilton, II .......... A63F 13/12 463/42 |
| 2010/0250360 A1* | 9/2010 | Ball ....................... G06Q 30/02 705/14.29 |
| 2011/0112662 A1 | 5/2011 | Thompson et al. |

OTHER PUBLICATIONS

"Barter network aims to help Mile End's cash-strapped live well" Durnford, Megan. The Gazette [Montreal, Que.]Jan. 23, 1996: 8.5. Retrieved via ProQuest.

International Preliminary Report on Patentability of PCT/US2010/041363 dated Jan. 17, 2012, all pages.

\* cited by examiner

ALTERNATIVE VALUE EXCHANGE SYSTEMS AND METHODS

PRIORITY CLAIM

This application is a continuation of U.S. application Ser. No. 12/576,931, entitled "Alternative Value Exchange Systems And Methods," filed Oct. 9, 2009, which claims benefit to U.S. Provisional Application No. 61/225,256, entitled "Alternative Value Exchange Systems And Methods," filed on Jul. 14, 2009, both of which are incorporated by reference in their entirety for any and all purposes.

FIELD OF THE INVENTION

The present invention relates, in general, to currency exchange and, more particularly, to exchanging alternative currencies.

BACKGROUND OF THE INVENTION

Alternative currencies are an emerging trend. Some alternative currencies have been created in response to a lack of long-term confidence in monetary methods of exchange; some as a community hedge against inflation; others merely as a medium of exchange between members of a physical or virtual community, among other reasons.

There are many different types of alternative currencies (herein also "alternative forms of value" or simply "alternative value"), each currency representing what the community holds valuable (e.g. time, labor/skill, goods/services, etc.). Alternative currencies currently in use include: "LindenDollars"—Second Life; Amazon.com's "Quest Gold"; World of Warcraft's (WoW) virtual "Gold"; Ithaca Hours (Ithaca, N.Y.); Carbon credits; regional currencies in Germany; "Dotz" (Brazil); Tradebank "Credits" (Construction-centric barter network); "Lassobucks" (Time/Skillset currency); Maha Vitaran—Indian power utility barters with other utilities for power; "Bartercard"—Loaded with goods & services (not cash), used in exchange for other goods & services. Many others are planned or currently in development.

The proliferation of alternative currencies has produced the need for those using such alternative currencies to exchange their holdings among different alternative currencies and/or to convert their holdings into a form of money.

Currency, as used herein, means a unit whose relative value is determined by a community. Currency, therefore, is distinguishable from money (e.g. the Dollar, Euro, Pound, Peso, etc.), whose value is determined at least partly by its issuing authority. Alternative currencies are emerging globally and are being used as a medium of trade in the place of money. In many instances, the value of an alternative currency is tied directly or indirectly to one or more specific forms of money, but in some instances this is not the case. Hence, improvements in the art are needed.

BRIEF SUMMARY OF THE INVENTION

Embodiments of the present invention are directed to a method of exchanging alternative currencies. The method includes creating, at an alternative currency platform, a plurality of user accounts and receiving, from a first user in the plurality of user accounts, an alternative currency exchange offer. The alternative currency exchange offer includes one or more offer terms and associated assets. The method further includes determining, at the alternative currency exchange platform, one or more users in the plurality of user accounts which are suitable users to enter into the alternative currency exchange offer based at least in part on the offer terms, publishing the one or more users to the first user, and receiving a selection of a second user from the one or more users from the first user. Furthermore, the method includes extending the alternative currency exchange offer from the first user to the second user, in response to receiving acceptance of the offer from the second user, verifying the associated assets of the first user and the second user, and in response to verification of the assets of the first user and second user, providing settlement of the alternative currency exchange offer.

In a further embodiment, an alternative currency platform is disclosed. The platform includes one or more processors configured to execute instructions stored on a memory device. The instructions include creating a plurality of user accounts, receiving, from a first user in the plurality of user accounts, an alternative currency exchange offer, wherein the alternative currency exchange offer includes one or more offer terms and associated assets, and determining one or more users in the plurality of user accounts which are suitable users to enter into the alternative currency exchange offer based at least in part on the offer terms. The instructions further include publishing the one or more users to the first user, receiving a selection of a second user from the one or more users from the first user, and extending the alternative currency exchange offer from the first user to the second user. Furthermore, the instructions include in response to receiving acceptance of the offer from the second user, verifying the associated assets of the first user and the second user, and in response to verification of the assets of the first user and second user, providing settlement of the alternative currency exchange offer.

In an alternative embodiment, a machine-readable medium is used for exchanging alternative currencies. The machine-readable medium includes instructions for creating, at an alternative currency platform, a plurality of user accounts and receiving, from a first user in the plurality of user accounts, an alternative currency exchange offer. The alternative currency exchange offer includes one or more offer terms and associated assets. The machine-readable medium further includes instructions for determining, at the alternative currency exchange platform, one or more users in the plurality of user accounts which are suitable users to enter into the alternative currency exchange offer based at least in part on the offer terms, publishing the one or more users to the first user, and receiving a selection of a second user from the one or more users from the first user. Furthermore, the machine-readable medium includes instructions for extending the alternative currency exchange offer from the first user to the second user, in response to receiving acceptance of the offer from the second user, verifying the associated assets of the first user and the second user, and in response to verification of the assets of the first user and second user, providing settlement of the alternative currency exchange offer.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When refer

DETAILED DESCRIPTION OF THE INVENTION

Embodiments of the present invention provide systems and methods for exchanging alternative currencies and/or "redeeming" them for a form of money. Exemplary embodiments provide a forum in which "buyers" or "sellers" of the currency can post their buy or sell "prices" and the quantity they are willing to buy or sell at the stated price. Buyers and sellers can post their prices in whatever units they desire, including alternative currency units. Some embodiments also provide a community forum in which members may discuss issues affecting alternative currency values to thereby promote a more broadly held consensus.

The operator of the system of the present invention may act as a market maker by actively buying and selling alternative currencies. In some embodiments, the operator may act as an escrow service, usable by the parties of an exchange to ensure that the units of currency are actually exchanged. Other embodiments are possible.

Exemplary embodiments may be implemented as a host computer system (referred to herein as the "Alternative Currency Platform") to which users connect from their personal computers, mobile devices, game systems, satellite and/or cable television system, and or the like. The host computer system may include one or more computing devices with associated memory and code for programming the computing devices to carry out the functions of the present invention.

The alternative currency platform may serve as a "Meta-Community," a community composed of many smaller communities. The common element shared by each of these communities is that they all use alternative currencies. The alternative currency platform may provide a means for members of a community to trade with other members of their own community or to trade their alternative currencies with other communities.

For example, if a member of the WoW community desires to have their taxes done by someone in another community who possesses the skill to do so (and is willing to be paid in WoW "Gold"), the alternative currency platform would provide a mechanism through which the trade of WoW "Gold" for tax preparation is made.

The alternative currency platform operator may collect a fee for the service provided. Alternatively, The alternative currency platform operator could charge a fee in accordance with the calculated value of the "principal" exchanged. The fee may be collected through means of a credit card account, a debit card account, DDA accounts (bank accounts), m-wallets, etc.

Furthermore, users may be able to receive an alternative currency wallet for use in holding and transferring alternative currencies. The alternative currency wallet may be used similar to a prepaid card account or m-wallet, but for alternative currencies. An owner of the alternative currencies wallet may take the wallet to a retail store, or the like and use the alternative currency to purchase goods and services at the retail store location. As such, the alternative currency may be able to be utilized "outside" of the alternative currency community.

The alternative currency exchange platform can be integrated into point of sale terminal devices in physical, on-line, and/or mobile retail locations/sites. The system would calculate the exchange rate for the alternative currency, debit the alternative currency from the alternative currency wallet, and then credit the retailer's alternative currency account.

Furthermore, the alternative currency exchange platform also may embody an "assessor" function. The assessor weighs each potential trade and informs the involved parties of what would constitute a "fair" trade based upon other trades performed within the alternative currency platform. Involved parties would need to indicate that they have been informed of the terms constituting a "fair" trade, but may opt out if they so choose and trade for whatever value the involved parties agree upon.

Some embodiments also provide a developer's language and API, which would allow the integration of the alternative currency platform functionality into other environments such as Facebook, or other such social networking environments.

Figure 1:
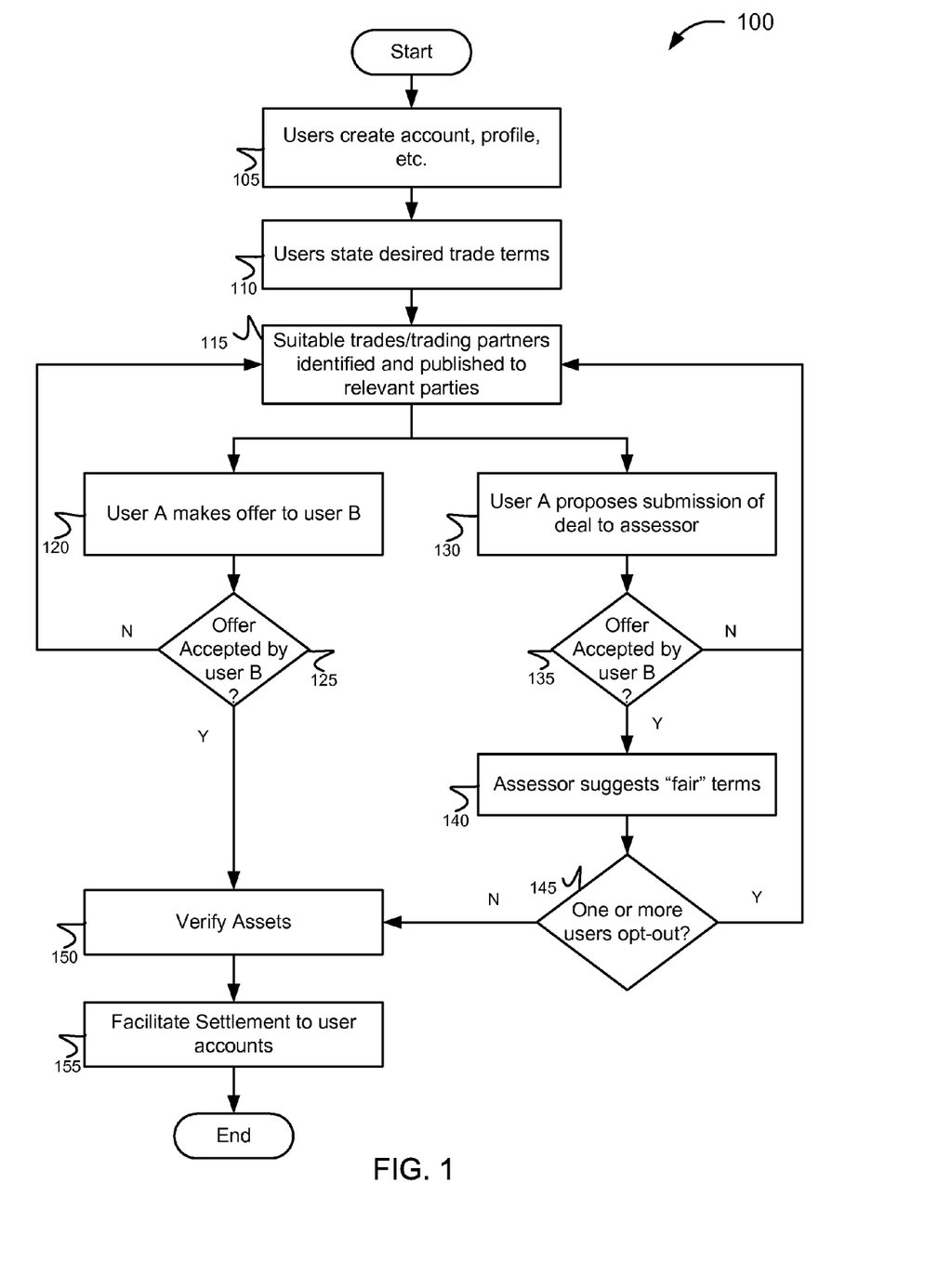
- FIG. 1 is a flow diagram illustrating a method of exchanging alternative currencies, according to one embodiment of the present invention.

Having described embodiments of the invention generally, attention is directed to FIG. 1, which depicts an exemplary method in accordance with a specific embodiment. Those skilled in the art will appreciate that the method 100 of exchanging alternative currencies is exemplary of a number of possible embodiments. Other embodiments may include more, fewer, or different steps than those illustrated and described herein.

The method 100 begins at block 105 where users create user accounts, profiles, and/or the like, or otherwise enroll into the currency exchange system. This may include, for example, compiling a list of all currencies held or desired and identifying currency issues, associated account numbers, or the like. At block 110 users state desired trade terms, which may include identifying what the user desires to trade/receive, for what they desire to trade/receive for it, and in some cases, the quantity they wish to trade/receive.

In one embodiment, the alternative currency to be traded and/or received may be a scrip (e.g., a California "IOU" or the like). The currency exchange system may have a physical location which a user could have a scrip (or similar form of value) authenticated. Once the scrip was authenticated, the corresponding value of the scrip could be entered into the alternative currency platform system and included in the user's account. The physical scrip would then be destroyed (i.e., to prevent the scrip from existing in two places simultaneously, thus devaluing the currency and undermining confidence in said currency), and the issuing body (i.e., the State of California) would be notified by the currency exchange system of the scrip's conversion/physical destruction. Accordingly, non-virtual value may be incorporated into the system and exchanged for other goods, services, alternative currencies, and the like.

At block 115, the alternative currency platform identifies potential trading partners. This may be accomplished by, for example, identifying pairs or groups of users whose stated desires could be settled among the identified users through a single trade or series of trades. In some cases, the alternative currency platform may have enough user-supplied information to settle trades without further involvement from the users and/or without further investigation. In other cases, however, there may not be an appropriate trade, based on the initial terms stated by the users, in which case the process continues along one of several possible paths. Upon identifying potential trading partners, the platform publishes the proposed trades to the relevant users.

At block 120, User A decides to make an offer to User B, whom the alternative currency platform identifies as a potential trading partner. At decision block 125, User B decides whether to accept User A's offer. If User B declines A's offer, the process returns to block 115; if, however, User B accepts User A's offer, the process continues at block 150, described hereinafter.

In an alternative embodiment, users A and B may be many users or a group of users as opposed to individual users. For example, user A and/or user B may be a user group or even a community or sub-community. In one example, a family may desire to collectively pool their frequent flyer miles and trade an individual for their massive on-line multiplayer game currency. In an alternative example, user A may be a group and user B may be a group where group A includes users which have pooled a variety of alternative currencies to make an offer to group B for their collective variety of alternative currencies. It would be apparent to one of ordinary skill in the art that any number of individuals or groups may combine any amount of alternative currencies or any type, and make an offer to trade such alternative currency. In turn, any number of users or groups of users may accept such an offer, and exchange any amount of alternative currencies and any number of types of alternative currencies. In other words, a 1-to-1, 1-to-many, many-to-1, or many-to-many transaction may occur.

Along another path at block 130, User A may propose to User B that they submit their trade to the platform assessor. In one embodiment, the accessor may analyze the exchange offer, and provide a value score based on the analysis. The value score provides a relative value of the offer. Furthermore, the accessor may certify the offer as a "fair" (or valued) offer according to accepted offer standards. If User B declines this offer, then the process returns to block 115. If User B accepts the offer (decision block 135), then the process continues at block 140, at which the assessor suggests a "fair" trade. In accomplishing this, the assessor peruses recently-completed trades and associated exchange rates and trends, pending offers, external events, terms proposed by the users, or the like. Furthermore, the assessor may associate a "value score" with the offer, in order to denote a relative value of the offer (e.g., high, medium, low, or 25 out of 100, 50 out of 100, and so forth). If either (or any, if more than two trading partners involved) user decides to opt-out of the assessor's proposal (decision block 145), the process returns to block 115. Otherwise, the process continues at block 150. Alternatively, if one or more of the users decide to opt-out of the assessor's proposal, either of the users may present either an alternative proposal, or the users may agree to proceed with the original proposal (even though the accessor has not "certified" the original proposal as "fair").

At block 150, the alternative currency platform engages in a process of due diligence to further vet the trade. This may include verifying that the users actually have the value they state having to complete the trade. In some cases, the alternative currency platform contacts the issuer of the alternative currencies involved and/or the account servicer who holds the assets on behalf of the parties. If the assets are properly verified, then the alternative currency platform facilitates settlement of the trade at block 155.

Settlement of the trade at block 155 may include any of a variety of possible actions. In one specific example, the alternative currency platform communicates with the issuers of the alternative currencies involved in the trade and arranges appropriate amounts to be transferred between accounts. In accordance with this example, each of the issuers and the operator of the alternative currency platform may receive a fractional amount of the trade as compensation for providing the exchange service. In another example, the alternative currency platform may act as an escrow for one or both parties by holding value from one or both parties pending performance by the other. This is particularly relevant in cases in which one party has agreed to perform a service in exchange for an alternative currency. Escrowing may also be provided by the alternative currency platform such that the alternative currencies may be electronically stored and transmitted. Nonetheless, other possibilities exist which would be apparent to one or ordinary skill in the art.

Furthermore, user A or user B may be offering cash for the other user's alternative currency. In such a situation, the alternative currency platform (or other entity) may receive the cash and hold cash for the receiving user. The funds could be moved to a "will call" or similar holding location until the user claims the funds at, for example, an agent location of the alternative currency platform. Alternatively, the alternative currency platform may allow the user to "pull" the funds to a prepaid card account, a bank account, a mobile wallet (a g-wallet, e-wallet, m-wallet, etc), or the like.

Figure 2:
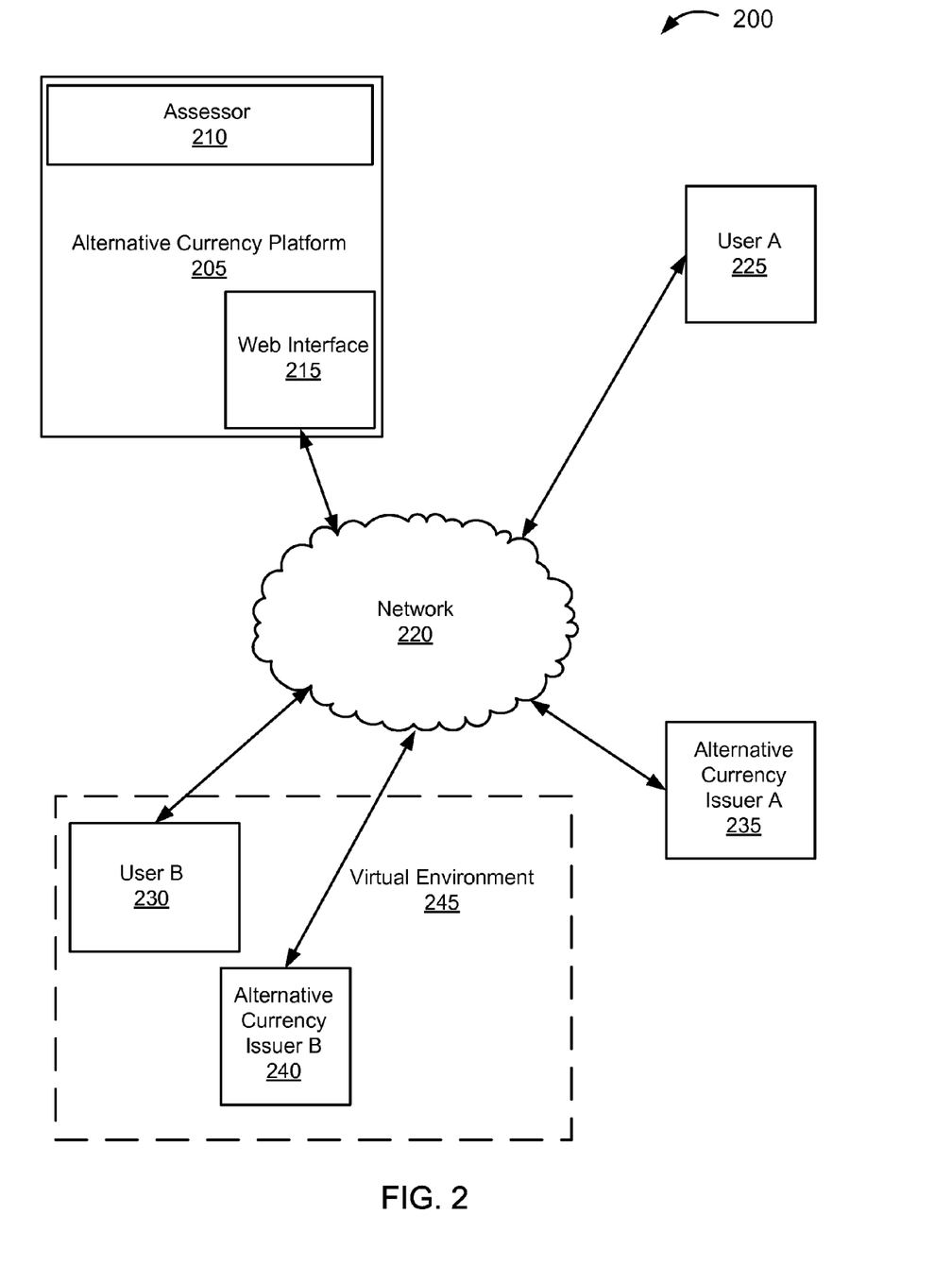
FIG. 2 is a block diagram illustrating an alternative value exchange system, according to one embodiment of the present invention.

Having described an exemplary method according to embodiments of the invention, attention is directed to FIG. 2, which depicts an exemplary system 200 in which embodiments of the invention may be implemented. The system includes an alternative currency platform 205, which includes an assessor 210 and a web interface 215 or other appropriate user interface.

Users (225 and 230) are able to access the alternative currency platform 205 through a network 220, which may be the Internet, POTS, cellular network, or the like. Alternative currency issuers A and B (235, 240) are the issuers of currencies held by users A and B, respectively. They may also interact with the alternative currency platform 205 through a network 220.

Notably, user B 230 exists within a virtual environment 245. This may be, for example, Second Life™, FaceBook™, or the like. In specific embodiments, user B 230 may wish to exchange LindenDollars from a store front location in SecondLife operated by the operator of the alternative currency platform 205. User B 230 wishes to acquire User A 225's airline miles issued by alternative currency issuer A 235, an airline company. Furthermore, goods and/or services may be traded among users. For example, an accountant may trade accounting services for airline miles or a dentist may trade dental services for LindenDollars. Additionally, virtual goods may be traded. Such virtual goods may include digital gifts (e.g., eCards, eBalloons, etc.), virtual gaming goods (e.g., virtual swords, virtual currency, virtual clothing, level-up bonuses, etc.), and the like. Any such virtual goods may be traded for any other virtual goods, services (virtual or physical), virtual currencies, alternative currencies, etc. Accordingly, those skilled in the art will recognize this as merely a single example among many possible examples according to embodiments of the invention. As mentioned previously, a suitable trade may involve three or more parties forming a closed trading loop through three or more different forms of alternative currency.

Figure 3:
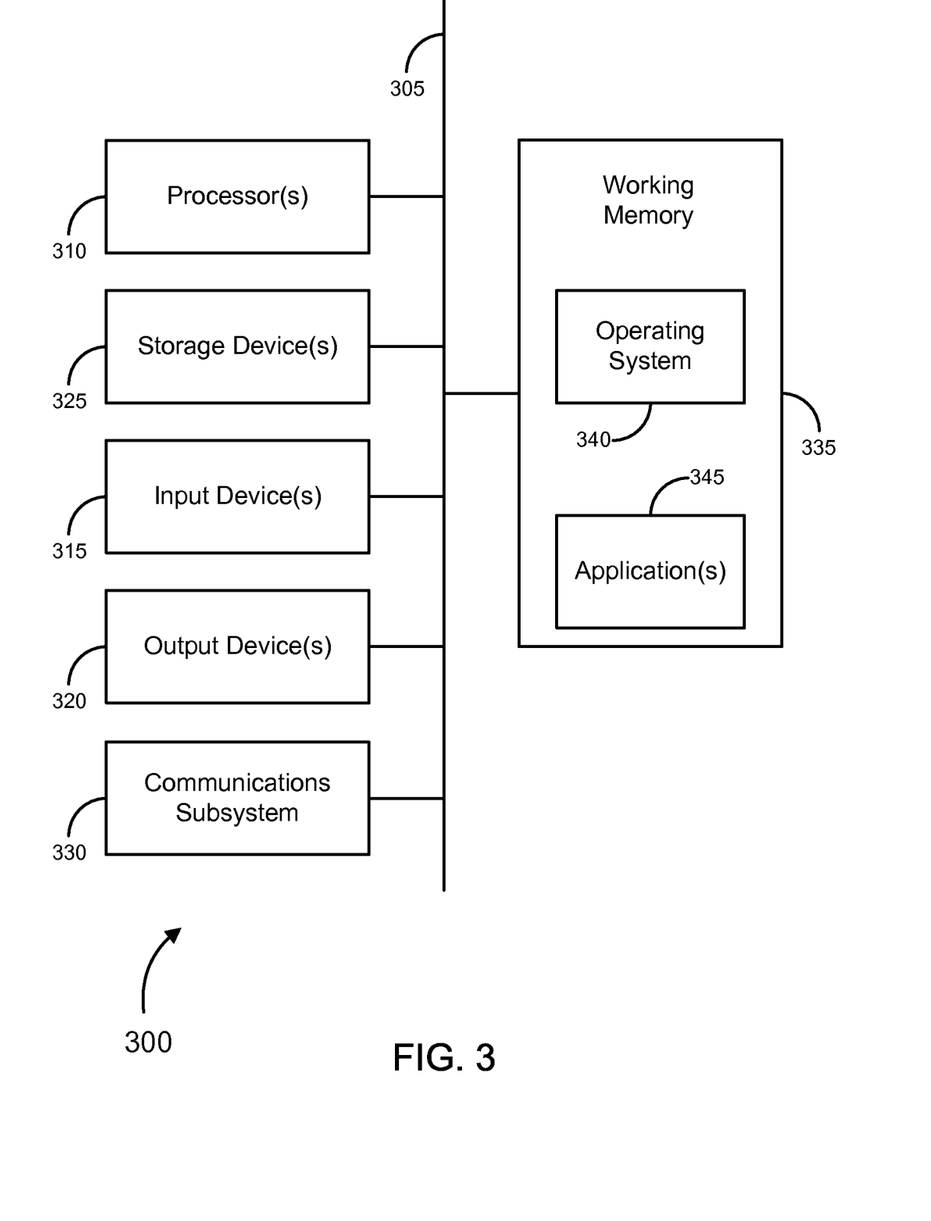
FIG. 3 is a generalized schematic diagram illustrating a computer system, in accordance with various embodiments of the invention.

FIG. 3 provides a schematic illustration of one embodiment of a computer system 300 that can perform the methods of the invention, as described herein, and/or can function as, for example, the alternative currency platform 205. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements can include one or more processors 310, including, without limitation, one or more general-purpose processors and/or one or more special-purpose processors (such as digital signal processing chips, graphics acceleration chips, and/or the like); one or more input devices 315, which can include, without limitation, a mouse, a keyboard and/or the like; and one or more output devices 320, which can include, without limitation, a display device, a printer and/or the like.

The computer system 300 may further include (and/or be in communication with) one or more storage devices 325, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 300 might also include a communications subsystem 330, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 330 may permit data to be exchanged with a network (such as the network described below, to name one example), and/or any other devices described herein. In many embodiments, the computer system 300 will further comprise a working memory 335, which can include a RAM or ROM device, as described above.

The computer system 300 can also comprise software elements, shown as being currently located within the working memory 335, including an operating system 340 and/or other code, such as one or more application programs 345, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 325 described above. In some cases, the storage medium might be incorporated within a computer system, such as the system 300. In other embodiments, the storage medium might be separate from a computer system (e.g., a removable medium, such as a compact disc, etc.), and or provided in an installation package, such that the storage medium can be used to program a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection with other computing devices such as network input/output devices may be employed.

In one aspect, the invention employs a computer system (such as the computer system 300) to perform methods of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another machine-readable medium, such as one or more of the storage device(s) 325. Merely by way of example, execution of the sequences of instructions contained in the working memory 335 might cause the processor(s) 310 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 300, various machine-readable media might be involved in providing instructions/code to processor(s) 310 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 325. Volatile media includes, without limitation, dynamic memory, such as the working memory 335. Transmission media includes coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc., carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
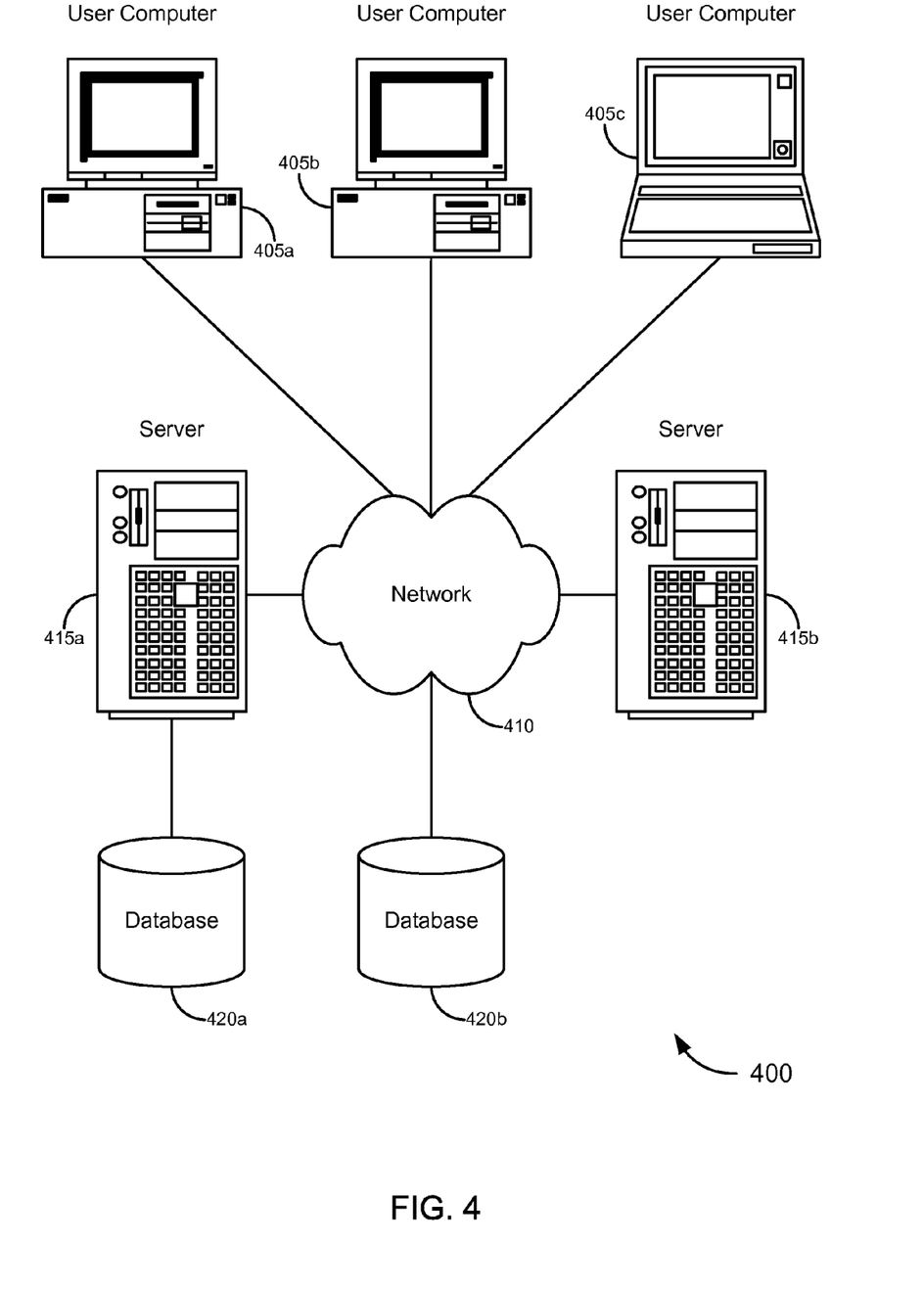
FIG. 4 is a block diagram illustrating a networked system of computers, which can be used in accordance with various embodiments of the invention.

A set of embodiments comprises systems for exchanging alternative currencies. Merely by way of example, FIG. 4 illustrates a schematic diagram of a system 400 that can be used in accordance with one set of embodiments. The system 400 can include one or more user computers 405. The user computers 405 can be general purpose personal computers (including, merely by way of example, personal computers and/or laptop computers running any appropriate flavor of Microsoft Corp.'s Windows™ (e.g., Vista™) and/or Apple Corp.'s Macintosh™ operating systems) and/or workstation computers running any of a variety of commercially-available UNIX™ or UNIX-like operating systems. These user computers 405 can also have any of a variety of applications, including one or more applications configured to perform methods of the invention, as well as one or more office applications, database client and/or server applications, and web browser applications. Alternatively, the user computers 405 can be any other electronic device, such as a thin-client computer, Internet-enabled mobile telephone, and/or personal digital assistant (PDA), capable of communicating via a network (e.g., the network 410 described below) and/or displaying and navigating web pages or other types of electronic documents. Although the exemplary system 400 is shown with three user computers 405, any number of user computers can be supported.

Certain embodiments of the invention operate in a networked environment, which can include a network 410. The network 410 can be any type of network familiar to those skilled in the art that can support data communications using any of a variety of commercially-available protocols, including without limitation TCP/IP, SNA, IPX, AppleTalk, and the like. Merely by way of example, the network 410 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 415. Each of the server computers 415 may be configured with an operating system, including without limitation any of those discussed above, as well as any commercially (or freely) available server operating systems. Each of the servers 415 may also be running one or more applications, which can be configured to provide services to one or more clients 405 and/or other servers 415.

Merely by way of example, one of the servers 415 may be a web server, which can be used, merely by way of example, to process requests for web pages or other electronic documents from user computers 405. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 405 to perform methods of the invention.

The server computers 415, in some embodiments, might include one or more application servers, which can include one or more applications accessible by a client running on one or more of the client computers 405 and/or other servers 415. Merely by way of example, the server(s) 415 can be one or more general purpose computers capable of executing programs or scripts in response to the user computers 405 and/or other servers 415, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 405 and/or another server 415. In some embodiments, an application server can create web pages dynamically for displaying the information in accordance with embodiments of the invention, such as web interface 215 in FIG. 2. Data provided by an application server may be formatted as web pages (comprising HTML, Javascript, etc., for example) and/or may be forwarded to a user computer 405 via a web server (as described above, for example). Similarly, a web server might receive web page requests and/or input data from a user computer 405 and/or forward the web page requests and/or input data to an application server. In some cases, a web server may be integrated with an application server.

In accordance with further embodiments, one or more servers 415 can function as a file server and/or can include one or more of the files (e.g., application code, data files, etc.) necessary to implement methods of the invention incorporated by an application running on a user computer 405 and/or another server 415. Alternatively, as those skilled in the art will appreciate, a file server can include all necessary files, allowing such an application to be invoked remotely by a user computer 405 and/or server 415. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420. The location of the database(s) 420 is discretionary: merely by way of example, a database 420a might reside on a storage medium local to (and/or resident in) a server 415a (and/or a user computer 405). Alternatively, a database 420b can be remote from any or all of the computers 405, 415, so long as the database can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 420 can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of exchanging alternative currencies, the method comprising:
   receiving, by an alternative currency platform, an alternative currency exchange offer from a first computer server of a virtual environment, via an application programming interface (API) of the alternative currency platform, wherein the alternative currency exchange offer is initiated by a first user device operating within the virtual environment, the first user device associated with a first user in a plurality of user accounts of the virtual environment, wherein the alternative currency exchange offer includes one or more offer terms and associated assets, the alternative currency exchange offer involving, at least one virtual currency issued by the first virtual environment;
   receiving, from the first computer server of the first virtual environment and via the API of the alternative currency platform, a selection of a second user from the plurality of user accounts, the selection made by the first user via the first user device;
   identifying, by the alternative currency platform, a second virtual environment associated with the selected second user, wherein the second virtual environment is different from the first virtual environment;
   forwarding, by the alternative currency platform, the alternative currency exchange offer the second user, by transmitting the one or more offer terms to a second computer server of the virtual environment via the API of the alternative currency platform;
   receiving, a request initiated by the first user or the second user to submit the alternative currency exchange offer to an assessor function of the alternative currency platform, the request received from either the computer server of the virtual environment and via the API of the alternative currency platform;
   in response to request, analyzing, by the assessor function, the alternative currency exchange offer to determine a relative value of the alternative currency exchange offer;
   based on the analysis, generating a value score for the alternative currency exchange offer; and
   in response to determining that the value score meets or exceeds a minimum threshold:
      certifying, by the assessor function, the alternative currency exchange offer as a valued offer; and
      in response to the assessor function certifying the alternative currency exchange offer, making available the alternative currency exchange offer from the first user to the second user.

2. The method of claim 1, further comprising:
   in response to receiving an acceptance of the offer from the second user, verifying the associated assets of the first user and the second user, said acceptance received from the second computer server of the second virtual environment, via API of the alternative currency platform; and
   in response to verification of the assets of the first user and second user, providing settlement of the alternative currency exchange offer.

3. The method of claim 2, further comprising:
   receiving, at the alternative currency platform, a request from the first user to transfer an amount of virtual currency to a financial account of the first user, said request received from the first computer server of the first virtual environment, via the API of the alternative currency platform;
   in response to the request, determining a conversion of the amount of the virtual currency to a cash value; and
   transferring the cash value of the amount of the virtual currency to the financial account.

4. The method of claim 1, further comprising determining, at the alternative currency exchange platform, one or more users in the plurality of user accounts which are suitable users to enter into the alternative currency exchange offer based at least in part on the offer terms.

5. The method of exchanging alternative currencies as in claim 1, wherein the associated assets include one or more of the following: virtual currency, loyalty points, loyalty rewards, services, virtual goods, and goods.

6. The method of exchanging alternative currencies as in claim 1, further comprising in response to receiving a rejection of the offer from the second user, identifying at least one more additional user in the plurality of user accounts which are suitable users to enter into the alternative currency exchange offer based at least in part on the offer terms, said rejection received from the second computer server of the second virtual environment, via the API of the alternative currency platform.

7. The method of exchanging alternative currencies as in claim 1, wherein the alternative currency exchange offer is carried out within one or more of the following types of virtual environments: social networking, on-line gaming, and virtual store.

8. The method of exchanging alternative currencies as in claim 1, further comprising receiving a counter-offer from the second user in response to the alternative currency exchange offer made available to the second user, the counter-offer from the second user modifying one or more of the offer terms and/or associated assets, said counter-offer receive from the second computer server of the second virtual environment, via the API of the alternative currency platform.

9. An alternative currency platform, the platform comprising:
one or more processors configured to execute instructions stored on a memory device, the instructions including:
receiving, by an alternative currency platform, an alternative currency exchange offer from a first computer server of a first virtual environment, via an application programming interface (API) of the alternative currency platform, wherein the alternative currency exchange offer is initiated by a first user device operating within the first environment, the first user device associated with a first user in a plurality of user accounts of the virtual environment, wherein the alternative currency exchange offer includes one or more offer terms and associated assets, the alternative currency exchange offer involving at least one virtual currency issued by the first virtual environment;
receiving, from the computer server of the first virtual environment and via the API of the alternative currency platform, a selection of a second user from the plurality of user accounts, the selection made by the first user via the first user device;
identifying, by the alternative currency platform, a second virtual environment associated with the selected second user, wherein the second virtual environment is different from the first virtual environment;
forwarding, by the alternative currency platform, the alternative currency exchange offer to the second user, by transmitting the one or more offer terms to a second computer server of the virtual environment via the API of the alternative currency platform;
receiving, a request initiated by the first user or the second user to submit the alternative currency exchange offer to an assessor function of the alternative currency platform, the request received from either the computer server of the virtual environment and via the API of the alternative currency platform;
in response to request, analyzing, by the assessor function, the alternative currency exchange offer to determine a relative value of the alternative currency exchange offer;
based on the analysis, generating a value score for the alternative currency exchange offer; and
in response to determining that the value score meets or exceeds a minimum threshold:
certifying, by the assessor function, the alternative currency exchange offer as a valued offer; and
in response to the assessor function certifying the alternative currency exchange offer, making available the alternative currency exchange offer from the first user to the second user.

10. The alternative currency platform as in claim 9, further comprising a web interface configured to receive selections regarding the offer and to display information about the offer.

11. A non-transitory computer-readable medium for exchanging alternative currencies, having sets of instructions stored thereon which, when executed by a computer, cause the computer to:
receive, by an alternative currency platform, an alternative currency exchange offer from a first computer server of a first virtual environment, via an application programming interface (API) of the alternative currency platform, wherein the alternative currency exchange offer is initiated by a first user device operating within the first virtual environment, the first user device associated with a first user in a plurality of user accounts of the virtual environment, wherein the alternative currency exchange offer includes one or more offer terms and associated assets, the alternative currency exchange offer involving at least one virtual currency issued by the first virtual environment;
receive, from the first computer server of the first virtual environment and via the API of the alternative currency platform, a selection of a second user from the plurality of user accounts, the selection made by the first user via the user device;
identify, by the alternative currency platform, a second virtual environment associated with the selected second user, wherein the second virtual environment is different from the first virtual environment;
forward, by the alternative currency platform, the alternative currency exchange offer to the second user, by transmitting the one or more offer terms to a second computer sever of the virtual environment via the API of the alternative currency platform;
receive, a request initiated by the first user or second user to submit the alternative currency exchange offer to an assessor function of the alternative currency platform, the request received from either the computer server of the virtual environment and via the API of the alternative currency platform;
in response to the request, analyze, by the assessor function, the alternative currency exchange offer to determine a relative value of the alternative currency exchange offer;
based on the analysis, generate a value score for the alternative currency exchange offer; and
in response to determining that the value score meets or exceeds a minimum threshold:
certifying, by the assessor function, the alternative currency exchange offer as a valued offer; and
in response to the assessor function certifying the alternative currency exchange offer, making available the alternative currency exchange offer from the first user to the second user.

12. The non-transitory computer-readable medium for exchanging alternative currencies as in claim 11, wherein the sets of instructions when further executed by the computer, cause the computer to, receive, authenticate, and store a scrip value in one of the plurality of user accounts, wherein the associated scrip includes an associated issuing body.

13. The non-transitory computer-readable medium for exchanging alternative currencies as in claim 12, wherein the sets of instructions when further executed by the computer, cause the computer to, in response to receiving and storing the scrip value in one of the plurality of user accounts, destroy the associated scrip.

14. The non-transitory computer-readable medium for exchanging alternative currencies as in claim 13, wherein the sets of instructions when further executed by the computer, cause the computer to, notify the associated issuing body of the destruction of the associated scrip.

15. The non-transitory computer-readable medium for exchanging alternative currencies as in claim 11, wherein the sets of instructions when further executed by the computer, cause the computer to:
   in response to receiving an acceptance of the offer from the second user, verify the associated assets of the first user and the second user, said acceptance received from the second computer server of the second virtual environment, via the API of the alternative currency platform; and
   in response to verification of the assets of the first user and second user, provide settlement of the alternative currency exchange offer.

16. The non-transitory computer-readable medium for exchanging alternative currencies as in claim 15, wherein the sets of instructions when further executed by the computer, cause the computer to:
   receive, at the alternative currency platform, a request from the first user to transfer an amount of virtual currency to a financial account of the first user, said request received from the first computer sever of the virtual environment, via the API of the alternative currency platform;
   in response to the request, determine a conversion of the amount of the virtual currency to a cash value; and
   transfer the cash value of the amount of the virtual currency to the financial account.

17. The non-transitory computer-readable medium for exchanging alternative currencies as in claim 11, wherein the sets of instructions when further executed by the computer, cause the computer to: determine, at the alternative currency exchange platform, one or more users in the plurality of user accounts which are suitable users to enter into the alternative currency exchange offer based at least in part on the offer terms.

18. The method of claim 1, wherein certifying the alternative currency exchange offer as a valued offer comprises:
   analyzing, by the assessor function, data corresponding to a plurality of previous currency exchanges performed within the alternative currency platform; and
   determining, by the assessor function, whether the alternative currency exchange offer corresponds to a fair trade, based on the analysis of the previous currency exchanges performed within the alternative currency platform.

19. The method of claim 18, further comprising:
   determining, by the assessor function, that the alternative currency exchange offer does not correspond to a fair trade, based on the analysis of the previous currency exchanges performed within the alternative currency platform;
   in response to determining that the alternative currency exchange offer does not correspond to a fair trade, proposing, by the assessor function, an updated alternative currency exchange offer by modifying one or more of the offer terms or the associated assets;
   determining, by the assessor function, that the updated alternative currency exchange offer correspond to a fair trade; and
   transmitting notifications to the first user and the second user, the notifications including the updated alternative currency exchange offer, including at least the modified offer terms or the associated assets.

20. The method of claim 18, wherein the alternative currency exchange offer includes three or more parties forming a closed trading loop through three or more different forms of alternative currency, and
   wherein determining whether the alternative currency exchange offer corresponds to a fair trade comprises determining whether the alternative currency exchange offer corresponds to a fair trade for each of the three or more parties.

* * * * *

UNITED STATES PATENT AND TRADEMARK OFFICE
CERTIFICATE OF CORRECTION

PATENT NO. : 10,083,485 B2  
APPLICATION NO. : 14/176159  
DATED : September 25, 2018  
INVENTOR(S) : Evans Mehew and Gail Galuppo Page 1 of 1

It is certified that error appears in the above-identified patent and that said Letters Patent is hereby corrected as shown below:

In the Claims

Claim 1, Column 11, Line 57, please insert the word -- first -- between "a" and "virtual";  
Claim 1, Column 11, Line 61, please insert the word -- first -- between "the" and "virtual";  
Claim 1, Column 12, Line 11, please insert the word -- to -- between "offer" and "the";  
Claim 1, Column 12, Line 21, please insert the word -- the -- between "to" and "request";  
Claim 2, Column 12, Line 40, please insert the word -- the -- between "via" and "API";  
Claim 8, Column 13, Line 18, please delete "receive" and insert the word -- received --;  
Claim 9, Column 13, Line 31, please insert the word -- virtual -- between "first" and "environment";  
Claim 9, Column 13, Line 39, please insert the word -- first -- between "the" and "computer";  
Claim 9, Column 13, Line 60, please insert the word -- the -- between "to" and "request";  
Claim 11, Column 14, Line 33, please insert the word -- first -- between "the" and "user";  
Claim 11, Column 14, Line 40, please delete the word "sever" and insert -- server --;  
Claim 16, Column 15, Line 32, please delete the word "sever" and insert -- server --;  
Claim 16, Column 15, Line 33, please insert the word -- first -- before "virtual".

Signed and Sealed this  
Eleventh Day of June, 2019

Andrei Iancu  
*Director of the United States Patent and Trademark Office*